United States Patent
Khudyakov et al.

(12)
(10) Patent No.: US 6,489,376 B1
(45) Date of Patent: Dec. 3, 2002

(54) FORMULATION OF UV-CURABLE COATINGS FOR OPTICAL FIBER FOR A FAST CURE

(75) Inventors: Igor V. Khudyakov, Hickory, NC (US); Michael B. Purvis, Hickory, NC (US); Robert J. Overton, Lenior, NC (US)

(73) Assignee: Alcatel, Paris (FR)

( * ) Notice: Subject to any disclaimer, the term of this patent is extended or adjusted under 35 U.S.C. 154(b) by 0 days.

(21) Appl. No.: 09/630,322

(22) Filed: Jul. 31, 2000

(51) Int. Cl.⁷ ................. C08F 2/46; C08F 2/50
(52) U.S. Cl. .............. 522/96; 522/90; 522/97; 522/40; 522/120; 522/121; 522/150; 522/151; 522/152; 522/181; 522/182; 522/77
(58) Field of Search .............. 522/96, 181, 182, 522/90, 121, 120, 40–49, 97, 150, 151, 152, 77

(56) References Cited

U.S. PATENT DOCUMENTS

| | | | |
|---|---|---|---|
| 4,663,185 A | | 5/1987 | Eckberg |
| 4,908,297 A | * | 3/1990 | Head et al. ................. 430/284 |
| 4,932,750 A | * | 6/1990 | Ansel et al. ............. 350/96.34 |
| 4,968,116 A | | 11/1990 | Hulme-Lowe et al. |
| 4,973,611 A | * | 11/1990 | Puder .......................... 522/42 |
| 5,139,872 A | | 8/1992 | Lapin et al. |
| 5,188,864 A | | 2/1993 | Lee et al. |
| 5,248,752 A | | 9/1993 | Argyropoulos et al. |
| 5,333,234 A | | 7/1994 | Hashimoto et al. |
| 5,496,870 A | | 3/1996 | Chawla et al. |
| 5,566,027 A | | 10/1996 | Saitoh et al. |
| 5,567,794 A | | 10/1996 | Barraud et al. |
| 5,569,725 A | | 10/1996 | Carroll et al. |
| 5,756,209 A | | 5/1998 | Hale |
| 5,777,024 A | | 7/1998 | Killilea et al. |
| 5,822,489 A | | 10/1998 | Hale |
| 5,846,911 A | | 12/1998 | Freyhardt et al. |
| 5,881,194 A | * | 3/1999 | Duecker et al. ............ 385/115 |
| 5,908,873 A | * | 6/1999 | Shustack ..................... 522/39 |
| 6,001,913 A | | 12/1999 | Thames et al. |
| 6,022,285 A | | 2/2000 | Bourhis et al. |
| 6,026,207 A | | 2/2000 | Reddy et al. |
| 6,029,476 A | | 2/2000 | Bourhis et al. |
| 6,048,911 A | | 4/2000 | Shustack et al. |
| 6,122,428 A | * | 9/2000 | Duecker ..................... 385/115 |
| 6,187,835 B1 | * | 2/2001 | Szum et al. .................. 522/96 |

FOREIGN PATENT DOCUMENTS

WO    WO00/01781    1/2000

* cited by examiner

Primary Examiner—James J. Seidleck
Assistant Examiner—Sanza L. McClendon
(74) Attorney, Agent, or Firm—Sughrue Mion, PLLC

(57) ABSTRACT

A fast-curing, low viscosity composition for coating an optical waveguide, more specifically, an optical fiber, and optical fibers coated therewith are disclosed. The coating composition is a radiation curable composition containing: a radiation curable oligomer, a free radical photoinitiator, and a mixture of reactive diluents including a low molecular weight (meth)acrylate having tri-, tetra-, penta- or higher functionality.

18 Claims, No Drawings

FORMULATION OF UV-CURABLE COATINGS FOR OPTICAL FIBER FOR A FAST CURE

BACKGROUND

The invention relates to a curable composition suitable for coating ribbon matrices and glass surfaces, specifically, coating optical waveguides such as optical fibers, the coating compositions having a faster cure time to achieve greater line speeds.

Optical fibers made from drawn glass have been used as a reliable transmission medium in telecommunications cables. Glass optical fibers are widely used because they have the ability to carry large amounts of information over long distances.

To facilitate these long-distance transmissions, optical fiber waveguides have been coated with plastic compositions of various materials in order to protect the fiber and increase its tensile strength. Generally, to accomplish this optical glass fibers are frequently coated with two superposed coatings. The coating which contacts the glass is a relatively soft, primary coating that must satisfactorily adhere to the fiber and be soft enough to resist microbending especially at low service temperatures. The outer, exposed coating is a much harder secondary coating that provides the desired resistance to handling forces yet must be flexible enough to enable the coated fiber to withstand repeated bending without cracking the coating.

Optical fiber coating compositions, whether they are inner primary or single coatings, generally comprise before cure an ethylenically-unsaturated monomer or oligomer dissolved or dispersed in a liquid ethylenically-unsaturated medium and a photoinitiator. The coating composition is typically applied to the optical glass fiber in liquid form and then exposed to actinic radiation to effect cure.

In practice, the most commonly used coatings have been derived from acrylates. The most widely used acrylates are those which are capable of ultraviolet radiation curing at high speed since the coatings are normally applied immediately after the glass fiber has been drawn from the molten state. Typical of such acrylates are mono- or difunctional (meth)acrylate terminated monomers and oligomers. The outer coatings are most often urethane-acrylate or epoxy-acrylate copolymers which also can be cured by ultraviolet radiation (See Shustack et al, U.S. Pat. No. 6,048,911; Barraud et al, U.S. Pat. No. 5,650,231).

Coatings are applied to the fiber in-line during fiber drawing. As the state of fiber drawing technology has allowed for increased draw speeds to effectuate longer and thinner optical fibers, however, the need for coating compositions that can cure at faster rates coincident with the faster draw speeds has become more urgent. Thus, as draw speeds have increased, a need has developed for materials that cure at faster rates than is currently available with traditional technology.

U.S. Pat. No. 4,663,185 to Eckberg, et al. describes a method of making a UV curable acrylated polymers by blending difunctional acrylate monomers of up to 50 wt % of the total composition to result in a hard, glassy coating to enhance abrasion resistance.

U.S. Pat. No. 4,968,116 to Hulme-Lowe, et al. describes a cladding composition using polyfunctional acrylates being difunctional or higher, at levels ranging from 2–35% in order to crosslink the resin to produce a hard coating.

U.S. Pat. No. 5,188,864 to Lee, et al. describes adhesion promoters for UV curable siloxane compositions that may contain up to 10 wt % multifunctional acrylates being difunctional or higher.

U.S. Pat. No. 6,001,913 to Thames, et al. describes a UV curable, high-gloss coating formulation which uses difunctional acrylates without the use of volatile organic components (VOC). Such coating compositions are poured to approximately a 2 mil thickness.

The present inventors have found that a liquid, non-crosslinked, UV curable composition having an decreased cure time can be provided by adding multifunctional low molecular weight acrylates to a composition comprising a radiation curable oligomer, a free radical photoinitiator, and a reactive diluent.

SUMMARY

There is provided a liquid, radiation curable composition, said composition comprising (a) a radiation curable oligomer, (b) a free radical photoinitiator, and (c) a mixture of reactive diluents comprising (i) at least one mono- or difunctional reactive diluent and (ii) at least one polyfunctional reactive diluent having at least three (meth)acrylate functionalities. The polyfunctional reactive diluent component (ii) increases the cure rate of the composition. A process line speed of at least 1000 mpm may be achieved.

The present curable coating composition may include from 50 wt % to 95 wt %, for example, from 60 wt % to 90 wt %, e.g., from 70 wt % to 85 wt % of radiation curable oligomer (a). The amount of free radical photoinitiator (b) should be sufficient to initiate photopolymerization. The present curable coating composition may include from 5 wt % to 50 wt %, for example, from 10 wt % to 40 wt %, e.g., from 15 wt % to 30 wt % of total reactive diluent (c), which includes both (i) the mono- or difunctional reactive diluent and (ii) the polyfunctional reactive diluent having at least three (meth)acrylic functionalities.

DETAILED DESCRIPTION

Coating compositions in accordance with the present invention may advantageously be utilized for both primary and secondary coatings for optical fibers.

As used herein, the term "primary coating" is defined as that coating which directly contacts the glass portion of the optical fiber. The uncured primary coating should be liquid at room temperature. The uncured primary coating should have a viscosity suitable for high speed processing, and the uncured primary coating should have a high cure speed. The cured primary coating should exhibit good adhesion to glass to prevent premature delamination of the coating from the glass portion of the optical fiber. The cured primary coating should have a low modulus at lower temperatures to minimize the effects of microbend attenuation due to small stresses on the optical fiber itself. The cured primary coating should have a refractive index high enough to ensure that errant signals escaping from the glass core are refracted back to the core of the optical fiber.

As used herein, the term "secondary coating" is defined as the coating which covers the primary coating on the optical fiber. The cured secondary coating should have sufficient modulus to give impact resistance and to provide a protective barrier, and give tensile strength to the optical fiber. The cured secondary coating should exhibit little physical change over a wide temperature range, good resistance to water and solvent absorption and have good color stability.

The uncured liquid primary or secondary coating composition should have a sufficiently low viscosity that the composition will be easily applied to form a continuous protective coating on the glass fibers. Examples of such viscosity are those on the order of magnitude of about $10^3$ cP at 45–50° C., e.g., from about $2 \times 10^3$ to about $8 \times 10^3$ cP at room temperature. There is no particular limitation on viscosity, however, and it can be adjusted to a given application by known methods. For example, viscosity can be adjusted depending on the type of optical fiber material being formulated and the method of application.

Generally, the thickness of the cured primary or secondary coating will be dependent on the intended use of the optical fiber, although thicknesses of about 20 to 35 microns, and in particular thicknesses of about 25 to 30 microns, are suitable.

When used as primary coatings, cured coatings in accordance with the present invention may have a glass transition temperature ($T_g$) of from about −60° C. to about 0° C., for example, from about −50 to about −30° C., and, e.g., about −40° C., and a low modulus of elasticity of from about 0.5 to about 3.0 MPa at room temperature (20° C.) and 50% relative humidity, for example, from about 1.0 to about 2.5 MPa.

When utilized as a secondary coating, cured coatings in accordance with the present invention may have a glass transition temperature ($T_g$) of from about 40 to about 100° C. The cured secondary coatings may have a $T_g$ of from about 50 to about 80° C., for example, about 75° C. The cured secondary coatings may have a low modulus of elasticity of from about 5.0 to about 60 MPa at around 80° C. and 50% relative humidity, for example, from about 20 to about 40 MPa, and, eg., about 30 MPa.

The addition of low molecular weight polyfunctional (meth)acrylates having at least three (meth)acrylate functionalities to a liquid, radiation curable composition can accelerate the cure speed of the composition. Examples of such polyfunctional (meth)acrylates include those having tri-, tetra-, or pentafunctionality. The addition of such polyfunctional (meth)acrylates also allows tailoring of the mechanical properties of the curable coating composition. For example, with the increasing addition of these (meth) acrylates to liquid, radiation curable compositions, coating toughness, glass transition temperature, $T_g$, and the coating's modulus may be increased. The addition of smaller amounts of such (meth)acrylates, however, will help to accelerate cure but avoid a noticeable increase of crosslinking density of the composition upon cure. In this way, the small amounts of acrylates having tri-, tetra-, penta- or higher functionalities will not impart an undesirable hardness to the primary coating. The addition of higher amounts of such (meth)acrylates will result in an undesirable increase in modulus, hardness, and crosslinking, which are unsuitable characteristics for primary optical fiber coatings.

Preferably, the polyfunctional (meth)acrylates used to accelerate the rate of cure of the coating composition are trifunctional, tetrafunctional or pentafunctional monomers. An example of a trifunctional monomer is SR 454, an ethoxylated trimethylolpropane triacrylate commercially available from Sartomer Co. An example of a tetrafunctional monomer is the commercially available SR 355, a di-trimethylolpropane tetraacrylate manufactured by Sartomer. An example of a pentafunctional monomer is SR 399, a dipentaerythritol pentaacrylate, also commercially available from Sartomer.

The amount of such polyfunctional (meth)acrylates having at least three (meth)acrylate functionalities used in the coating formulation may be from about 0.5 to 3 wt %, for example, from about 0.5 to about 2.0 wt % of the total weight of composition. Any more than 3% will result in a high gloss, or hard, abrasion-resistant coating which is unsuitable for primary optical fiber coating.

The curable coating composition includes a radiation curable oligomer, for example, a urethane acrylate oligomer. The oligomer may be synthesized by methods known in the art or purchased commercially.

Suitable commercially available oligomers can be obtained from the following. Polyether-based, aliphatic urethane acrylate compounds are available from UCB Chemical Corp. They are sold under the name Ebecryl, and include Ebecryl 230. Ebecryl 230 is a difunctional aliphatic urethane acrylate oligomer with a polyether backbone.

Polyester-based, aliphatic urethane acrylate oligomers are available from Sartomer. They are sold under the name CN966xxx, and include CN966J75, a difunctional aliphatic urethane acrylate oligomer with a polyester backbone. These oligomers are also available from Henkel Corp., which manufactures Photomer products, including Photomer 6010. A polyester polyol, which can be used to make a polyester-based urethane acrylate oligomer, is Desmophen 2001KS, available from Bayer Corp. This product is an ethylene butylene adipate diol.

A urethane acrylate oligomer may be formed by reacting a polyol, for example a diol, with a multifunctional isocyanate, for example a diisocyanate, and then end-capping with a hydroxy-functional (meth)acrylate.

The polyol may be a polyol with a number average molecular weight of about 200–10,000, such as polyether polyol, polyester polyol, polycarbonate polyol, and hydrocarbon polyol.

Polyether polyols may be homopolymers or copolymers of alkylene oxides including $C_2$ to $C_5$ alkylene oxides such as, for example, ethylene oxide, propylene oxide, butylene oxide, tetrahydrofuran, and 3-methyltetrahydrofuran; homopolymers or copolymers of the above alkylene oxides obtained by using, as an initiator, $C_{14}$ to $C_{40}$ polyols, such as 12-hydroxystearyl alcohol and hydrogenated dimerdiol; and adducts of the above alkylene oxides with bisphenol-A or hydrogenated bisphenol-A. These polyether polyols may be used alone or in combination of two or more.

Polyester polyols may be, for example, addition reaction products of a diol component and a lactone, reaction products of the diol component and a polyvalent carboxylic acid, and addition reaction products of three components, including the diol component, a dibasic acid, and the lactone. The diol component may be $C_2$ to $C_{40}$ aliphatic diols with a low molecular weight such as ethylene glycol, propylene glycol, diethylene glycol, dipropylene glycol, 1,4-butanediol, 1,5-pentanediol, 3-methyl-1,5-pentanediol, 2,4-diethyl-1,5-pentanediol, 1,6-hexane glycol, neopentyl glycol, 1,9-nonanediol, 1,10-decanediol, 12-hydroxystearyl alcohol, and hydrogenated dimerdiol; and an alkylene oxide adduct of bisphenol-A. The lactone may be, for example, epsilon-caprolactone, delta-valerolactone, and beta-methyl-delta-valerolactone. The polyvalent carboxylic acid may be, for example, aliphatic dicarboxylic acids such as succinic acid, adipic acid, azelaic acid, sebacic acid, and dodecanedioic acid; and aromatic dicarboxylic acids such as hexahydrophthalic acid, tetrahydrophthalic acid, phthalic acid, isophthalic acid, and terephthalic acid.

Polycarbonate polyols may be, for example, polycarbonate diols which are obtainable by a reaction of a short chain dialkylcarbonate and a component selected from aforementioned polyether polyols, polyester polyols and diol components such as 2-methylpropanediol, dipropylene glycol, 1,4-butanediol, 1,6-hexanediol, 3-methyl-1,5-pentanediol, neopentyl glycol, 1,5-octanediol, and 1,4-bis-(hydroxymethyl)cyclohexane. The short chain dialkylcarbonate may be $C_1$–$C_4$ alkylcarbonates such as, for example, dimethylcarbonate and diethylcarbonate.

Polyols with a low molecular weight may be used. Examples of polyols with a low molecular weight include ethylene glycol, propylene glycol, tripropylene glycol, 1,3- or 1,4-butanediol, neopentyl glycol, 1,6-hexanediol, 1,9-nonanediol, 1,10-decanediol, higher fatty acid polyols and higher hydrocarbon polyols such as castor oil, coconut oil, monomyristins (1-monomyristin and 2-monomyristin), monopalmitins (1-monopalmitin and 2-monopalmitin), monostearins (1-monostearin and 2-monostearin), monooleins (1-monoolein and 2-monoolein), 9,10-dioxystearic acid, 12-hydroxyricinoleyl alcohol, 12-hydroxystearyl alcohol, 1,16-hexadecanediol (juniperic acid or a reduction product of thapcic acid), 1,21-henicosanediol (a reduction product of Japanese acid), chimyl alcohol, batyl alcohol, selachyl alcohol, and dimeric acid diol.

A multi-functional isocyanate used in the present invention may be, for example, an aromatic polyisocyanate, an aromatic aliphatic polyisocyanate, an alicyclic polyisocyanate, or an aliphatic polyisocyanate.

Examples of the aromatic polyisocyanates include diisocyanates such as m-phenylene diisocyanate, p-phenylene diisocyanate, 4,4'-diphenyl diisocyanate, 1,5-naphthalene diisocyanate, 4,4'-diphenylmethane diisocyanate, 2,4- or 2,6-tolylene diisocyanate, 4,4'-toluidine diisocyanate, and 4,4'-diphenyl ether diisocyanate; and polyisocyanates such as triphenylmethane-4,4',4"-triisocyanate, 1,3,5-triisocyanatebenzene, 2,4,6-triisocyanatetoluene, and 4,4'-diphenylmethane-2,2',5,5'-tetraisocyanate.

Examples of the aromatic aliphatic polyisocyanates include diisocyanates such as 1,3- or 1,4-xylylene diisocyanate or mixtures thereof and 1,3- or 1,4-bis(1-isocyanate-1-methylethyl)benzene or mixtures thereof; and polyisocyanates such as 1,3,5-triisocyanatemethylbenzene.

Examples of the alicyclic polyisocyanates include diisocyanates such as 1,3-cyclopentene diisocyanate, 1,4-cyclohexane diisocyanate, 1,3-cyclohexane diisocyanate, 3-isocyanatemethyl-3,5,5-trimethylcyclohexyl isocyanate (isophorone diisocyanate or IPDI), 4,4'-methylenebis (cyclohexyl isocyanate) ($H_{12}$MDI or Desmodur W, available from Bayer), methyl-2,4-cyclohexane diisocyanate, methyl-2,6-cyclohexane diisocyanate, and 1,3- or 1,4-bis (isocyanatemethyl)cyclohexane; and polyisocyanates such as 1,3,5-triisocyanatecyclohexane, 1,3,5-trimethylisocyanatecyclohexane, 2-(3-isocyanatepropyl)-2,5-di(isocyanatemethyl)-bicyclo(2.2.1)heptane, 2-(3-isocyanatepropyl)-2,6-di(isocyanatemethyl)-bicyclo(2.2.1) heptane, 3-(3-isocyanatepropyl)-2,5-di(isocyanatemethyl)-bicyclo(2.2.1)heptane, 5-(2-isocyanateethyl)-2-isocyanatemethyl-3-(3-isocyanatepropyl)-bicyclo(2. 2.1) heptane, 6-(2-isocyanateethyl)-2-isocyanatemethyl-3-(3-isocyanatepropyl)-bicyclo(2.2.1)heptane, 5-(2-isocyanateethyl)-2-isocyanatemethyl-2-(3-isocyanatepropyl)-bicyclo(2.2.1)heptane, and 6-(2-isocyanateethyl)-2-isocyanatemethyl-2-(3-isocyanatepropyl)-bicyclo(2.2.1)heptane.

Examples of the aliphatic polyisocyanates include diisocyanates such as trimethylene diisocyatnate, tetramethylene diisocyanate, hexamethylene diisocyanate, pentamethylene diisocyanate, 1,2-propylene diisocyanate, 1,2-butylene diisocyanate, 2,3-butylene diisocyanate, 1,3-butylene diisocyanate, 2,4,4- or 2,2,4-trimethylhexamethylene diisocyanate, and 2,6-diisocyanatemethylcaproate; and polyisocyanates such as lysine ester triisocyanate, 1,4,8-triisocyanateoctane, 1,6,11-triisocyanateundecane, 1,8-diisocyanate-4-isocyanatemethyloctane, 1,3,6-triisocyanatehexane, and 2,5,7-trimethyl-1,8-isocyanate-5-isocyanatemethyloctane.

Moreover, derivatives from the above polyisocyanates can be used. Examples of the derivatives include a dimer, a trimer, biuret, allophanate, carbodiimide, polymethylenepolyphenyl polyisocyanate (referred to as crude MDI or polymeric MDI), crude TDI, and an adduct of an isocyanate compound and a polyol with a low molecular weight.

"(Meth)acrylate" means acrylate, methacrylate, or a mixture thereof.

Examples of the hydroxy-functional (meth)acrylates include 2-hydroxyethyl (meth)acrylate, 2-hydroxypropyl (meth)acrylate, 2-hydroxybutyl (meth)acrylate, 4-hydroxybutyl (meth)acrylate, pentanediol mono(meth) acrylate, 2-hydroxy-3-phenyloxypropyl (meth)acrylate, 2-hydroxyalkyl(meth)acryloyl phosphate, 4-hydroxycyclohexyl (meth)acrylate, cyclohexanedimethanol mono(meth)acrylate, neopentyl glycol mono(meth) acrylate, trimethylolpropane di(meth)acrylate, and pentaerythritol tri(meth)acrylate. Additional examples include compounds which are obtainable by an addition reaction of a glycidyl group-containing compound and a (meth)acrylic acid, such as alkyl glycidyl ether and glycidyl (meth) acrylate. The above hydroxyl group-containing (meth) acrylates may be used alone or in combination of two or more.

The molecular weight range of the radiation curable oligomer may vary from 5000 to 25,000 MW based upon the specific requirements for properties of the primary or secondary coating in accordance with the present invention.

Any suitable free radical photoinitiator may be included in the coating composition. Suitable free radical-type photoinitiators include, for example, an acyl phosphine oxide photoinitiator, more specifically, a benzoyl diaryl phosphine oxide photoinitiator. An example of a suitable benzoyl diaryl phosphine oxide photoinitiator is: 2,4,6-trimethylbenzoyldiphenyl-phosphine oxide (Lucerin TPO available from BASF). Further examples of free radical-type photoinitiators include: hydroxycyclohexylphenylketone; hydroxymethylphenylpropanone; dimethoxyphenylacetophenone; 2-methyl-1-[4-(methyl thio)-phenyl]-2-morpholinopropanone-1; 1-(4-isopropylphenyl)-2-hydroxy-2-methylpropan-1-one; 1-(4-dodecyl-phenyl)-2-hydroxy-2-methylpropan-1-one; 4-(2-hydroxyethoxy)phenyl-2(2-hydroxy-2-propyl)-ketone; diethoxyphenyl acetophenone; 2,4,6-trimethylbenzoyl diphenylphosphone; a mixture of (2,6-dimethoxy benzoyl)-2,4,4-trimethylpentylphosphineoxide and 2-hydroxy-2-methyl-1-phenyl-propane-1-one; and mixtures of the foregoing. Many of these are sold under the names Irgacure® and Darocur® and are available from Ciba Additives.

The free radical photoinitiator may be a mixture of phosphine oxide photoinitiators, an example of which is Darocur 4265 available from Ciba Additives. This particular photoiniator is a 50:50 weight percent mixture of diphenyl-2,4,6-trimethyl benzoly phosphine oxide and 2-hydroxy-2-methyl-1-phenylpropan-1-one. Another is Irgacure 1700 (also from Ciba Additives), a blend of bis(2,6-dimethoxybenzoyl)-2,4,4-trimethylpentylphosphine oxide and 2-hydroxy-2-methyl-1-phenyl-propane-1-one.

The free radical-type photoinitiator may be used in an amount of 10% or less by weight, for example, about 0.25 to about 6% by weight, e.g., about 4% by weight based upon the total weight of the composition.

A present mixture of reactive diluents is included in the present coating composition. While not wishing to be bound by theory, it is theorized that, during the polymerization of the urethane acrylate oligomer, the reactive diluent(s) hooks together chains of the urethane acrylate oligomer. Adequate curing of the coating compositions of the present invention is promoted by the presence of the reactive diluent(s). The reactive diluent, especially the mono- or difunctional component (i) thereof, also functions as a solvent for the urethane acrylate oligomer. The use of the reactive diluent(s) allows the formulator to adjust the viscosity of the solution to improve processability. In other words, the reactive diluent prevents the viscosity of the oligomer composition from becoming too viscous or inflexible for suitable primary or secondary optical fiber coating use.

The mono- or difunctional reactive diluent(s) may, for example, be a lower molecular weight, liquid (meth)acrylate-functional compound including the following di(meth)acrylates and monofunctional (meth)acrylates: tridecyl acrylate, 1,6-hexanediol diacrylate, 1,4-butanediol diacrylate, ethylene glycol diacrylate, diethylene glycol diacrylate, tetraethylene glycol diacrylate, tripropylene glycol diacrylate, neopentyl glycol diacrylate, 1,4-butanediol dimethacrylate, poly(butanediol) diacrylate, tetrathylene glycol dimethacrylate, 1,3-butylene glycol diacrylate, tetraethylene glycol diacrylate, triisopropylene glycol diacrylate, triisopropylene glycol diacrylate, and ethoxylated bisphenol-A diacrylate. Another example of a reactive diluent is N-vinyl caprolactam (International Specialty Products). Further examples are the commercially available products from Sartomer, SR 489, a tridecyl acrylate and SR 506, an isobornyl acrylate.

The present radiation curable coating compositions may be free of non-reactive diluents, such as water or organic solvents, which lack ethylenic unsaturation.

The weight ratio of the first mono- or difunctional reactive diluent (i) to the second polyfunctional reactive diluent (ii) having at least three functionalities may be at least 3 to 1, for example, at least 10 to 1, e.g., at least 20 to 1.

The primary coating composition may include an adhesion promoter. Examples of adhesion promoters include acid functional materials and organofunctional silanes. For example, the organofunctional silane may be an amino-functional silane, an acrylamido-functional silane, a mercapto-functional silane, an allyl-functional silane, a vinyl-functional silane, a methylacrylate-functional silane, and an acrylate-functional silane. The organofunctional silane may be mercaptoalkyl trialkoxyl silane, a methacryloyxlalkyl trialkoxy silane, an aminoalkyl trialkoxyl silane, a vinyl trialikoxyl silane, 3-aminopropyl triethoxy silane, 3-methacryloxy-propyltrimethoxy silane, gamma-mercaptopropyl trimethoxy silane, gama-mercaptopropyl (gamma-mercaptopropyl)triethoxy silane, beta-(3,4-epoxycyclohexyl) ethyl trimethoxy silane, gamma-glycidoxypropyl trimethoxy silane, 3-vinylthiopropyl trimethoxy silane, vinyl-tris-(beta-methoxyethoxy) silane, vinyl triacetoxy silane, and mixtures thereof. A particular trialkoxysilane adhesion promoter is UCT 7840KG from United Chemical Technologies. A further adhesion promoter is KBM 803, a 3-(trimethoxysilyl)propyl thiol from Shin-Etsu Chemical Co., Ltd.

The adhesion promoter, if used, may be present in the primary coating composition in an amount of from about 0.1 to about 10% by weight, for example, from about 0.1 to about 3% by weight, and, e.g., from about 1% by weight, based upon the total weight of the composition.

Other components that may be utilized in the coating composition include antioxidants, such as Ionol available from Aldrich, which is a 2,4,6-tri-tert-butyl-4-methylphenol; flow control agents such as BYK331, a polysiloxane available from BYK-Chemie USA; sensitizers such as thioxanthone or isopropylthioxanthone (ITX) and their derivatives; stabilizers and wetting agents. Suitable amounts are known to those of ordinary skill in the art.

The foregoing coating components may be mixed or blended together using any known equipment and an optical fiber may be coated with the coating composition by any known optical fiber production technique.

The techniques may involve a draw tower in which a preformed glass rod is heated to produce a thin fiber of glass. The fiber is pulled vertically through the draw tower and, along the way, the fiber passes through one or more coating stations at which various coatings are applied and cured in-line to the newly drawn fiber. The coating stations may each contain a die having an exit orifice that is sized to apply the particular coating to the fiber in a desired thickness. Monitoring and measuring devices may be provided near each station to ensure that the coating applied at that station is coated concentrically and to the desired diameter.

Examples of optical fiber coating techniques include the methods disclosed in U.S. Pat. Nos. 4,351,657, 4,512,281, 4,531,959, 4,539,219, 4,792,347, and 4,867,775.

After the fiber is coated with the curable coating composition, the coating composition may be cured by exposure to a sufficient curing amount of UV irradiation. For example, the coated fiber may be exposed to UV irradiation at a rate of from about 5 to 1000 mJ/cm$^2$.

EXAMPLES

For some of the experimental data presented below, an oligomer formulation was prepared as follows.

Test Examples 1 and 2

Desmophen 2001KS (Bayer Corp.) was reacted with stoichiometric amounts of isophorone diisocyanate (IPDI) (Creanova) and 2-hydroxyethylacrylate (2-HEA) (Aldrich) to synthesize an oligomer with MW of about 10,000. The formulations of the experimental test samples are summarized in Table 1, wherein Test Example 1 contains 1.5 wt % of SR 355 and Test Example 2 contains 1.5 wt % of SR 399.

Comparative Example 1

The same oligomer formulation was used to produce a comparative resin sample, but without SR 355 or SR 399. This formulation is summarized in Table 1, wherein all components are presented in weight percentages (wt %):

TABLE 1

|  | Test Examples 1 or 2 | Comparative Example 1 |
|---|---|---|
| Desmophen 2001KS/IPDI/2-HEA oligomer | 54.79 wt % | 55.79 wt % |
| Ebecryl 230 | 9 | 9 |
| CN 966J75 | 9 | 9 |
| UCT 7840KG | 1 | 1 |
| SR 489 | 8 | 8 |
| SR 506 | 8 | 8 |
| TRPGDA | 5 | 5 |
| Darocur 4265 | 4 | 4 |
| BYK331 | ~0.01 | ~0.01 |
| Ionol | ~0.20 | ~0.20 |
| SR 355 or SR 399 | 1.5 | N/A |
| Total | 100 | 100 |

Desmophen 2001KS—ethylene butylene adipate diol (Bayer)
Ebecryl 230—difunctional aliphatic urethane acrylate oligomer with a polyether backbone (UCB Radcure)
CN 966J75—difunctional aliphatic urethane acrylate oligomer with a polyester backbone (Sartomer)
UCT 7840KG—trialkoxysilane adhesion promoter (United Chemical Techologies)
SR 489—tridecyl acrylate (Sartomer)
SR 506—isobornyl acrylate (Sartomer)
SR 355—di-trimethylolpropane tetraacrylate (Sartomer)
SR 399—dipentaerythritol pentaacrylate (Sartomer)
TRPGDA—tripropylene glycol diacrylate (UCB Radcure)
Darocur 4265—a 50:50 mixture of diphenyl-2,4,6-trimethylbenzoyl phosphine oxide and 2-hydroxy-2-methyl-1-phenylpropan-1-one (Ciba Specialty Chemicals)
BYK331—polysiloxane (BYK-Chemie USA) Ionol—2,4,6-tri-tert-butyl4-methylphenol (Aldrich)

Experiment 1

Kinetics of Cure for a Primary Coating Composition

Test Examples 1 and 2, and Comparative Example 1 formulations were evenly spread out flat to a 25 micron to 1 mil thickness. All thin films were placed on the diamond crystal of a spectrometer and cured by a spot UV-irradiation light source (Lightnincure 200 manufactured by Hamamatsu) at low intensity (75–1000 $\mu$W/cm$^2$) and flushed with nitrogen at ambient temperatures before and during curing. The spectrometer used was a Magna 550 FT IR spectrometer manufactured by Nicolet, used in ATR mode to measure the completeness of cure by the disappearance of acrylate groups from the film. A SERIES software was used, allowing the monitoring and analysis of the kinetics of cure, which followed first-order law. Experiments were performed under the same ambient temperature (24° C.) and the same light intensity of 100 $\mu$W/cm$^2$. The results are shown in Table 2 below.

Photopolymerization of the primary coating without the addition of an acrylate having tri- or higher functionality has a rate constant k=0.37 s$^{-1}$. In contrast, the addition of 1.5 wt % of SR 355 appears to initiate polymerization at a faster rate constant k=0.48 s$^{-1}$ and the addition of 1.5 wt % of SR 399 appears to polymerize at a rate constant k=0.54 s$^{-1}$.

TABLE 2

|  | POLYMERIZATION first order rate constant k (s$^{-1}$) | PhotoDSC J/g |
|---|---|---|
| Comparative Example 1 | 0.37 | 100 |
| Test Example 1 | 0.48 | 103 |
| Test Example 2 | 0.54 | 113 |

Experiment 2

Photo Differential Scanning Calorimetry (PhotoDSC) Experiments on Primary Coating Formulations PhotoDSC was used to measure the exothermic heat of reaction in J/gram (J/g) associated with the cure of the polymerizable monomer upon exposure to light. PhotoDSC experiments were performed on the oligomer formulations described in Test Examples 1 and 2, and Comparative Example 1. All examples were flushed with nitrogen for five minutes prior to irradiation of the samples. Irradiation of the test samples was performed for 0.05 minutes using a Perkin-Elmer DSC7 using a 100 W mercury xenon lamp at 50° C. The results are shown in Table 2 above.

The results indicate a larger conversion of acrylate groups under a brief irradiation of coating in the presence of either a tetra- or pentafunctional acrylate.

Test Example 3

A commercially available primary coating OD1-65 (DSM Co.) was obtained. This resin does not have a photoinitiator, so 6 wt % of Darocur 4265 (Ciba Additives) was added. The tetrafunctional acrylate SR 355 was added to 1.5 wt %.

Test Example 4

The same primary coating formulation as in Test Example 3 was prepared with the exception that the pentafunctional acrylate SR 399 was added to 1.5 wt %.

Comparative Example 2

The same primary coating and photoinitiator mixture as in Test Example 1 was used, with the exception that no SR 355 or SR 399 was added.

Experiment 3

Mechanical Properties of Cured Primary Coatings

Coatings of Test Examples 3 and 4 and Comparative Example 2 were prepared by casting a film on a Mylar film to a thickness of between 0.1 and 0.2 millimeters. The cast film was cured with an Iwasaki UV processor under a nitrogen blanket. UV-light exposure was 0.1 J/cm$^2$. Portions of the cured samples, measuring 30 millimeters long, 6.25 millimeters wide and 0.15 millimeters thick, were cut and then conditioned for 24 hours before measurements were taken at room temperature and at 50% relative humidity. The tensile modulus and elongation of the test and comparative examples were tested using an Instron Model 5564 following ASTM D638M. The test samples were attached onto the upper grip of a crosshead movement type of testing instrument equipped with a load cell. The crosshead was lowered to the initial gauge length and the sample specimen attached to the fixed grip. The crosshead speed of the Instron was set to 25 mm/min. The sample was then elongated at a constant rate of strain and the resulting stress-strain curve is recorded. The results were measured and analyzed with Instron Merlin™ software. The elongation is expressed in percent and the tensile modulus is expressed in MPa.

The results are summarized in Table 3 and indicate that addition of the tetra- and pentafunctional acrylates to a primary coating at low levels (1.5%) do not affect the mechanical properties of cured films within experimental error of their determination.

TABLE 3

| | Modulus, MPa | Elongation Prior To Break, % |
|---|---|---|
| Comparative Example 2 | 1.0 ± 0.3 | 180 ± 25 |
| Test Sample 3 | 1.1 ± 0.4 | 175 ± 25 |
| Test Sample 4 | 1.0 ± 0.3 | 190 ± 30 |

Test Example 5

As in Test Example 3, a commercially available primary coating OD1-65 (DSM Co.) was obtained. This resin does not have a photoinitiator, so 1 wt % of Darocur 1173 (2-hydroxy-2-methyl-1-phenylpropan-1-one from Ciba Additives) was added. The tetrafunctional acrylate SR 355 was added to 2 wt %.

Test Example 6

The same primary coating formulation as in Test Example 5 was prepared with the exception that the pentafunctional acrylate SR 399 was added to 2 wt %.

Comparative Example 3

The same primary coating and photoinitiator mixture as in Test Example 5 was used, with the exception that no SR 355 or SR 399 was added.

Experiment 4

Photosensitivity of Primary Coating Formulations

Coatings of Test Examples 5 and 6 and Comparative Example 3 were prepared by casting an even film to a thickness of about 0.1 millimeters on the diamond crystal of a spectrometer. The cast films were spot cured as described in Experiment 1, with an Iwasaki UV processor under a nitrogen blanket. Three different UV-light exposures were tested: 60 mJ/cm$^2$, 120 mJ/cm$^2$, and 1000 mJ/cm$^2$. A Magna 550 FT IR spectrometer in ATR mode was used to measure the completeness of cure by the disappearance of acrylate groups from the film. The results are summarized in Table 4.

The results demonstrate that less UV-light energy (mJ/cm$^2$) is required to obtain the same degree of cure of primary coating formulations in the presence of low levels of (meth) acrylates with tetra- and pentafunctionalities. Thus, the presence of a small amount of low molecular weight multifunctional (meth)acrylates enables primary coating formulations to become more photosensitive.

TABLE 4

| | AVERAGE % OF CURE | | |
|---|---|---|---|
| FORMULATION | 60 mJ/cm$^2$ | 120 mJ/cm$^2$ | 1000 mJ/cm$^2$ |
| OD1-65 + 1% Darocur 1173 | 56 | 73 | 100 |
| OD1-65 + 1% Darocur 1173 + 2% SR 355 | 58 | 83 | 100 |
| OD1-65 + 1% Darocur 1173 + 2% SR 399 | 61 | 83 | 100 |

What is claimed is:

1. A liquid, radiation curable composition, said composition comprising (a) a radiation curable oligomer, (b) a free radical photoinitiator, and (c) a mixture of reactive diluents comprising (i) at least one mono- or difunctional reactive diluent and (ii) at least one polyfunctional reactive diluent having at least four (meth)acrylate functionalities.

2. The liquid, radiation curable composition of claim 1, wherein said radiation curable oligomer is a urethane acrylate oligomer having a backbone selected from the group consisting of a polyester backbone, a polyether backbone, and a polycarbonate backbone.

3. The liquid, radiation curable composition of claim 1, wherein said radiation curable oligomer is a urethane acrylate oligomer having an average molecular weight (MW) range from about 5,000 to about 25,000.

4. The liquid, radiation curable composition of claim 1, wherein said free radical photoinitiator is used in an amount of up to 6% by total weight of the composition.

5. The liquid, radiation curable composition of claim 1, wherein said free radical photoinitiator is selected from the group consisting of, acyl phosphine oxide, 2,4,6-trimethylbenzoyldiphenyl-phosphine oxide, bis (2,6-dimethoxybenzoyl)-2,4,4-trimethylpentylphosphine oxide, hydroxycyclohexylphenylketone; hydroxymethylphenylpropanone; dimethoxyphenylacetophenone; 2-methyl-1-[4-(methyl thio)-phenyl]-2-morpholinopropanone-1; 1-(4-isopropylphenyl)-2-hydroxy-2-methylpropan-1-one; 1-(4-dodecyl-phenyl)-2-hydroxy-2-methylpropan-1-one; 4-(2-hydroxyethoxy)phenyl-2(2-hydroxy-2-propyl)-ketone;

diethoxyphenyl acetophenone; 2,4,6 trimethylbenzoyl diphenylphosphone; and mixtures thereof.

6. The liquid, radiation curable composition of claim 1, wherein said mono- or difunctional reactive diluents (i) comprise monofunctional acrylates or diacrylates.

7. The liquid, radiation curable composition of claim 1, wherein said mono- or difunctional reactive diluents (i) are selected from the group consisting of tridecyl acrylate, 1,6-hexanediol diacrylate, 1,4-butanediol diacrylate, ethylene glycol diacrylate, diethylene glycol diacrylate, tetraethylene glycol diacrylate, tripropylene glycol diacrylate, neopentyl glycol diacrylate, 1,4-butanediol dimethacrylate, poly(butanediol) diacrylate, tetrathylene glycol dimethacrylate, 1,3-butylene glycol diacrylate, tetraethylene glycol diacrylate, triisopropylene glycol diacrylate, triisopropylene glycol diacrylate, ethoxylated bisphenol-A diacrylate, isobornyl acrylate, and N-vinyl caprolactam.

8. The liquid, radiation curable composition of claim 6, wherein the weight ratio of said mono- or difunctional reactive diluent (i) to said polyfunctional reactive diluent (ii) is at least 3 to 1.

9. The liquid, radiation curable composition of claim 1, wherein the amount of said polyfunctional reactive diluent (ii) is from about 0.5 to 3 wt % by total weight of the composition.

10. The liquid, radiation curable composition of claim 9, wherein said composition has a viscosity on the order of magnitude of about $10^3$ cP at 45–50° C.

11. The liquid, radiation curable composition of claim 10, wherein said composition has a viscosity of from about $2 \times 10^3$ to about $8 \times 10^3$ cP at room temperature.

12. A cured composition, said composition comprising (a) a radiation curable oligomer, (b) a free radical photoinitiator, and (c) a mixture of reactive diluents comprising (i) at least one mono- or difunctional reactive diluent and (ii) at least one polyfunctional reactive diluent having at least four (meth)acrylate functionalities.

13. The cured composition of claim 12, wherein said composition has a cured modulus of elasticity of from about 1 to 2.5 MPa at room temperature (20° C.) and 50% relative humidity.

14. The liquid, radiation curable composition of claim 1, further comprising an adhesion promoter.

15. The liquid, radiation curable compound of claim 14, wherein the adhesion promoter is selected form the group consisting of acid functional materials and organofuncional.

16. The cured composition of claim 12, wherein said composition has a cured modulus of elasticity of from about 0.5 to 3.0 MPa at room temperature (20° C.) and 50% relative humidity.

17. The liquid, radiation curable composition of claim 2, wherein said radiation curable oligomer is a urethane acrylate oligomer having a backbone selected from the group consisting of a polyester backbone and a polyether backbone.

18. The liquid, radiation curable composition of claim 1, wherein said radiation curable oligomer is a urethane acrylate oligomer that is the reaction product of a polyol selected from the group consisting of ethylene glycol, propylene glycol, tripropylene glycol, 1,3-butanediol, 1,4-butanediol, neopentyl glycol, 1,6-hexanediol, 1,9-nonanediol, 1,10-decanediol, castor oil, coconut oil, 1-monomyristin, 2-monomyristin, 1-monopalmitin, 2-monopalmitin, 1-monostearin, 2-monostearin, 1-monoolein, 2-monoolein, 9,10-dioxystearic acid, 12-hydroxyricinoleyl alcohol, 12-hydroxystearyl alcohol, 1,16-hexadecanediol, 1,21-henicosanediol, chimyl alcohol, batyl alcohol, selachyl alcohol, and dimeric acid diol.

* * * * *